(12) United States Patent
Newsome, III

(10) Patent No.: US 10,213,978 B2
(45) Date of Patent: Feb. 26, 2019

(54) WASTE MATERIAL REBALER WITH SIDE LOADING AND RETRIEVAL

(71) Applicant: Sonoco Development Inc., Hartsville, SC (US)

(72) Inventor: John L. Newsome, III, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 418 days.

(21) Appl. No.: 15/099,964

(22) Filed: Apr. 15, 2016

(65) Prior Publication Data

US 2016/0229144 A1 Aug. 11, 2016

Related U.S. Application Data

(63) Continuation of application No. 12/969,978, filed on Dec. 16, 2010, now Pat. No. 9,339,982.

(51) Int. Cl.
*B30B 9/30* (2006.01)

(52) U.S. Cl.
CPC ............ *B30B 9/3032* (2013.01); *B30B 9/301* (2013.01); *B30B 9/3014* (2013.01); *B30B 9/3057* (2013.01)

(58) Field of Classification Search
CPC ..... B30B 9/3032; B30B 9/301; B30B 9/3014; B30B 9/3057
See application file for complete search history.

(56) References Cited

U.S. PATENT DOCUMENTS

| | | | | | |
|---|---|---|---|---|---|
| 3,691,945 | A | * | 9/1972 | Guhl | B30B 9/30 100/229 R |
| 3,855,919 | A | * | 12/1974 | Potter | B30B 9/3007 100/215 |
| 6,085,486 | A | * | 7/2000 | Hunter | B30B 9/3007 100/17 |
| 7,127,985 | B2 | * | 10/2006 | Standlee | A01F 15/005 100/3 |
| 9,339,982 | B2 | * | 5/2016 | Newsome, III | B30B 9/301 |

* cited by examiner

*Primary Examiner* — Shelley Self
*Assistant Examiner* — Joseph Finan, Jr.
(74) *Attorney, Agent, or Firm* — Miller, Matthias & Hull LLP

(57) ABSTRACT

A method of forming a higher density bale of waste paper from two or more lower density bales of waste paper includes positioning the lower density bales intact and in side-by-side relationship with respect to each other, moving them to a compression zone, and compressing the bales together in the compression zone to form a higher density bale. The higher density bale can then be strapped to maintain its higher density configuration and shape. Thus, a larger tonnage of waste paper in bales can be loaded into a shipping container for transport. A rebaler for carrying out the method includes side feed and side retrieval of bales, significantly improving over traditional top feed machines.

17 Claims, 2 Drawing Sheets

WASTE MATERIAL REBALER WITH SIDE LOADING AND RETRIEVAL

CROSS-REFERENCE TO RELATED APPLICATIONS

This application is a continuation of U.S. patent application Ser. No. 12/969,978, filed on 16 Dec. 2010, and which is incorporated by reference in its entirety herein and for all purposes.

TECHNICAL FIELD

This disclosure relates generally to paper and more specifically to the baling of waste paper into bales for transport and handling.

BACKGROUND

The recycling of old corrugated cardboard (OCC), OCC scrap, and other waste paper is ecologically responsible, cost effective, and more efficient than making of virgin cardboard and other paper. Currently, waste paper recycling supports a large and growing industry in the Unites States and elsewhere. Generally, OCC and waste paper is compacted into relatively compact bales and transported to recycling centers for processing. For example, a grocery or retail store may have a small paper baler on-site that it uses to compress empty cardboard boxes into bales that can be picked up and transported to a recycling center. Paper bales created at such on-site locations may typically weight around one thousand pounds each and are known in the industry as low density bales.

Low density paper bales generally have been acceptable for transporting domestically from individual store locations to recycling centers and the like. However, markets for OCC and other scrap paper are growing rapidly in China and other countries. Transporting baled OCC and other waste paper internationally to these countries involves filling shipping containers with bales and transporting the containers abroad by container ship, which is expensive. A typical shipping container has a target weight capacity of between about 50,000 pounds and 60,000 pounds to obtain the most economical shipping cost per container. However, a container load of low density paper bales weighs significantly less than this target. Thus, it has been common to rebale these low density bales into higher density bales that meet the target weight when loaded into shipping containers to transporting abroad. It can also be more efficient to transport high density paper bales domestically since a higher tonnage can be transported on a single truck.

Paper rebaling generally has been done at central locations such as retail distribution centers to which low density paper bales are back-hauled from individual stores, or at recycling centers. This is due in part to the fact that machines for rebaling paper from low density paper bales into high density paper bales have been large, very expensive, and relatively complex to operate. In a typical high density rebaler, low density bales are placed on a conveyor and the binding wires are cut by an operator to free the baled paper. The conveyor carries the unbound bales up to the inlet of a vertically fed hydraulic baling machine, where they fall from the end of the end of the conveyor into the hopper of the baling machine. In the process, the unbound bales fall apart and the loose paper drops into the breach of the baling machine. When the breach is full, a hydraulic compression ram driven by a main cylinder compresses the paper into a compression chamber to form a high density mass of paper. The ram may cycle two or three times in this manner until a sufficient mass of compressed paper is pressed into the compression chamber to comprise a high density bale. The resulting high density bale is then bound with wire or other bindings and ejected from the baler for storage and transport. The process is generally inefficient due at least partially to the multiple cycling of the ram per bale and the process is sufficiently complex that it generally must be monitored and controlled by computer controllers. In addition, at least two workers generally are required to load bales onto the conveyor and cut the bindings before the bales are conveyed to the hopper of the baling machine.

There is a need for a waste paper rebaler for creating high density paper bales from lower density paper bales that is smaller, is fed from the side rather than the top, is simpler to operate, less expensive, and that does not require that the bindings of low density bales be removed or that the low density bales be unbound and their paper re-disbursed prior to the rebaling process. It is to the provision of such a rebaler and to a corresponding method of rebaling that the present disclosure is primarily directed.

SUMMARY

Briefly described, a waste paper rebaler comprises a horizontally oriented rectangular housing defining an internal chamber having an upstream end and a downstream end. A breach is defined at the upstream end of the chamber. A feed port is formed in the side of the housing at the upstream end adjacent the breach and is sized to receive two low density paper bales in side-by-side relationship. A compression chamber is formed at the downstream end of the housing and has a size corresponding to that of a paper bale. A hydraulically driven compression cylinder extends through the upstream end of the housing and drives a rectangular compression plate or ram through the breach and toward the compression chamber. An ejection port is formed, again in the side of the housing at the compression chamber, and a hydraulically driven ejector cylinder extends through the housing on the opposite side of the compression chamber. The ejector cylinder drives a rectangular ejector ram through the compression chamber and toward the ejector port. Significantly, both the feed port and the ejector port are formed in the sides of the housing and are positioned to be accessible by a fork lift truck.

In use, two low density paper bales, with wire bindings intact if desired, are loaded into the breach of the housing's internal chamber through the side loading feed port by a fork lift truck and operator. The machine is then activated, whereupon the compression ram pushes the two low density bales toward and progressively into the compression chamber and compresses the bales into a single high density bale. The high density bale may then be bound with bindings. The ejector ram then pushes the high density bale out of the compression chamber through the side mounted ejection port, from where they can then be moved by the fork lift operator to storage or staging locations.

The waste paper rebaler of this disclosure has a small footprint, is substantially less expensive to fabricate and operate than traditional rebalers, can be operated by a single worker with a forklift without the need for computer controls, and is efficient due in part to the fact that only a single cycle rather than 3 or more as in the prior art is required to create each high-density bale. Further, the side loading and removal features of the rebaler significantly simplify the loading of low density bales and the unloading of high density bales as compared to traditional top-load conveyor style balers. These and other features, aspects, and advantages of the waste paper rebaler of this disclosure will become more apparent upon review of the detailed description set forth below taken in conjunction with the accompanying drawing figure, which is briefly described as follows.

DETAILED DESCRIPTION

Figure 1:
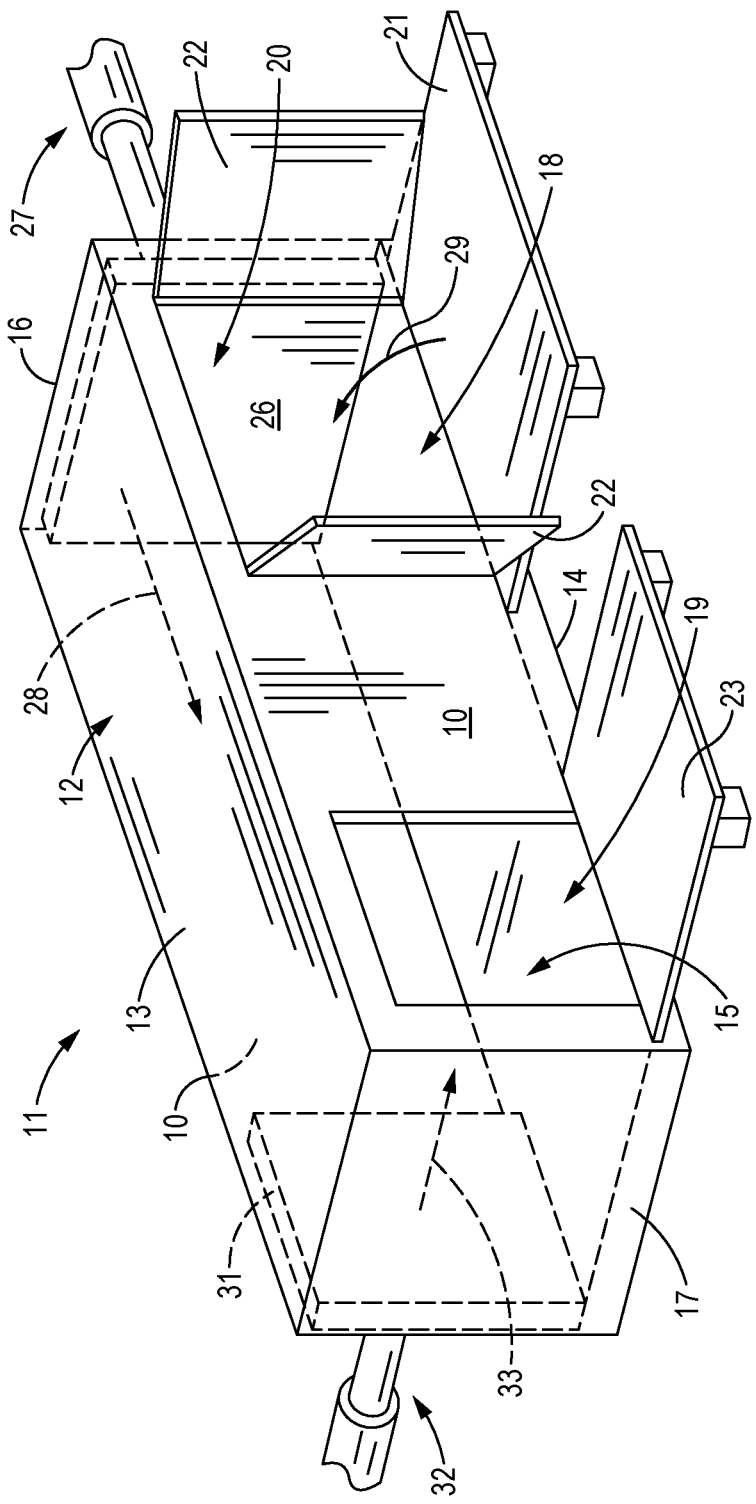
FIG. 1 is a perspective view of a waste paper rebaler that embodies principles of the invention in one preferred embodiment.

Referring now to the drawing figures, wherein like reference numerals indicate like parts throughout the views, a waste paper rebaler 11 is shown for compressing two (or more) low density waste paper bales into one high density waste paper bale. The invention may be described herein within the context of rebaling OCC, but the invention is not limited to OCC and any paper or other material (such as hay for example) may be recompressed into higher density bales with the rebaler disclosed herein. Further, the OCC need not necessarily be "old" or used, but can be industrial scrap, post consumer waste, or any other paper that can be baled and recycled.

The rebaler 11 comprises a generally rectangular housing 12 having a top 13, a bottom 14, sides 10, an upstream end 16, and a downstream end 17. The housing defines and internal chamber, also having an upstream end and a downstream end. A rectangular feed port 18 is formed in a side 10 of the housing adjacent the upstream end portion of the housing 12 and a smaller rectangular ejection port 19 is formed in the side 10 adjacent the downstream end portion of the housing. A loading platform 21 may be provided beneath and outboard of the feed port and a retrieval platform 23 may be located beneath and outboard of the ejection port 19. Doors 22, which may be closable with a hydraulic or mechanical closer (not shown) may be provided at the feed port for purposes described in more detail below. Alternatively or in addition to the doors 22, the loading platform 21 may be rotated upward in the direction of arrow 29 to close the feed port behind the low density bales 38 after they have been positioned in the breach 20. The ports and platforms provide for side loading and side retrieval of bales with fork lift or other transport device, which represents a great improvement over traditional balers having a conveyor that carries unbound bales up to be dumped into a top load hopper. A breach 20 of the rebaler 11 is formed within the upstream portion of the housing 12 adjacent the feed port 18. Similarly, a compression chamber 15 is defined within the downstream portion of the housing 12 adjacent the ejection port 19.

A rectangular compression plate or ram 26 is, in a rest position, disposed at the upstream end of the housing 12. The compression ram 26 is attached to the shaft of an extendable hydraulic cylinder 27 that extends through the upstream end of the housing 12. The hydraulic cylinder 27 can be activated to drive the compression ram 26 in a downstream direction through the breach and toward the compression chamber 15 as indicated by arrow 28. A rectangular ejection ram 31 is located at the downstream end portion 17 of the housing 12 and has a rest position against the side 10 of the housing opposite the ejection port 19. The ejection ram 31 is connected to the shaft of a hydraulic cylinder 32 that extends through the side 10 of the housing and can be actuated to drive the ejection ram 31 toward the ejection port 19, as indicated by arrow 33. It will be understood by those of skill in the art that FIG. 1 is a simplified drawing illustrating main components of the rebaler of this disclosure for clarity and ease of description. Of course, various supports, controls, power supplies, hydraulic reservoirs, pumps, etc. will be present, but are eliminated in the figures for clarity. Further, components may be configured differently than shown and some may be eliminated within the scope of the invention, only one embodiment of which is illustrated by the drawings.

Figure 2:
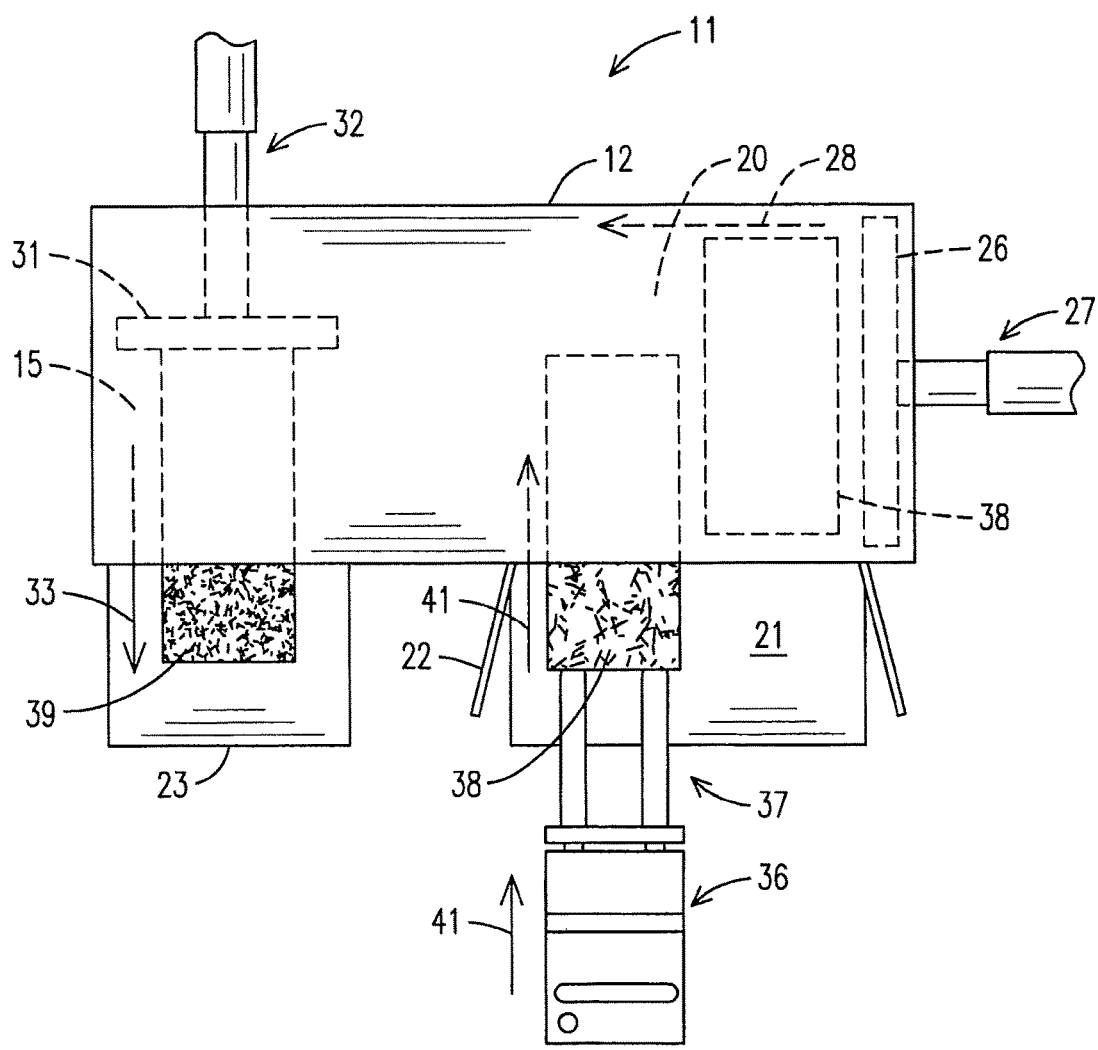
FIG. 2 is a top plan view of the rebaler illustrating loading of low density bales and ejection of a high density bale.

FIG. 2 is an overhead perspective that illustrates operation of the waste paper rebaler according to a preferred embodiment. An operator in a fork lift truck 36 retrieves low density paper bales 38 from a remote location and delivers them to the loading platform 21 of the rebaler 11. The loading platform 21 and the feed port 18 in the illustrated embodiment (FIG. 1) are sized to accept two low density bales side-by-side. The operator may place a bale on the loading platform and then back up and push the bale into the breach 20 of the housing with the forks of the fork lift truck. In FIG. 2, one low density bale 38 is shown positioned in the breach 20 while the operator is pushing the second low density bale 38 into the breach with the fork lift truck, as indicated by arrows 41. It will be clear from these figures that the side-loading feature of the rebaler represents a significant enhancement over traditional top loading balers. Once moved into the breach, the low density bales 38 are positioned in side-by-side relationship with respect to each other. Of course, the bales may be loaded into the breach by other methods such as, for instance, with a conveyor, a hand truck, an overhead crane, with pneumatic doors that close behind the bales and push them into the breach, or with any other technique designed to move the bales into the breach in a side-by-side relationship. All and any such techniques should be considered to be within the scope of the invention.

With the two low density bales 38 positioned in the breach intact and, if desired, with their bindings still in place, the hydraulic cylinder 27 is activated. This drives the compression ram 26 in direction 28 through the breach and toward the compression chamber 15 at the downstream end of the housing 12. When the bales reach the compression chamber, they engage an appropriate stop (not shown) at the downstream end of the housing, and the compression ram continues to advance. This causes the low density bales 38 to begin to be compressed together into a smaller volume, thus increasing the density per unit volume of the combined bales. When the bales have been compressed to approximately the volume and size of a single bale, they may be strapped together in know ways so that they are held in their compressed condition by the straps. In this state, the volume and size of the combined bales is approximately the same as the volume of each low density bale before compression. Consequently, the density of the resulting bale 39 is approximately twice the density and twice the weight of a low density bale, but about the same size. It is thus referred to as a high-density bale 39.

With the high density bale 39 created, the compression ram 26 can be retracted back to its ready position at the upstream end of the housing 12. The hydraulic cylinder 32 is then activated to drive the ejection ram 31 in a transverse direction as indicated by arrow 33. This pushes the high density bale 39 out of the compression chamber 15, through the side facing ejection port, and onto the retrieval platform 23, from where it can be retrieved with a fork lift truck and moved to a storage location awaiting loading into a shipping container. It will be recognized by those of skill in the art that the above disclosed process is more efficient, faster, and effective than prior art waste paper rebaling techniques. It does not require that the low density bales 38 be unbound and their paper re-disbursed, it completes the compression step each time with a single stroke of the compression ram, and delivers the resulting high density bale 39 to a convenient location for retrieval. Further, the side loading and side retrieval of bales with the rebaler of this invention significantly improves over traditional top loading balers. As a result, the apparatus of this disclosure can be operated by a single operator with a fork lift truck to produce high-density bales 39 at similar or likely higher rates than prior art rebalers, all with a reduced workforce.

The invention has been described herein in terms of preferred embodiments and methodologies considered by the inventor to represent the best mode of carrying out the invention illustrated thereby. It will be understood by those of skill in the art, however, that a wide range of additions, deletions, and modifications, both subtle and gross, might well be made to the illustrated embodiment without departing from the spirit and scope of the invention, which is defined only by the claims.

The invention claimed is:

1. A waste material rebaler comprising:
   a rectangular housing formed of first and second vertical side walls and a vertical end wall joined by horizontal top and bottom walls and defining an interior space having an upstream end, a downstream end proximate the vertical end wall, and a width defined by a distance between the first and second vertical side walls;
   a breach defined at the upstream end of the interior space and being sized to receive at least two strapped low density bales of waste material in side-by-side relationship with the long axes of the strapped bales extending across the width of the interior space;
   a compression chamber formed at the downstream end of the interior space in communication with the breach;
   a rectangular feed port formed in the first vertical side wall of the housing adjacent to and in communication with the breach, the feed port having a width, the feed port positioned to be accessible by a fork lift truck;
   a loading platform beneath and outboard of the feed port that rotates and closes the feed port behind the low density bales, the loading platform sized to accept two low density bales side-by-side;
   a compression ram selectively movable through the breach and toward the compression chamber to horizontally move the at least two strapped low density bales of waste material into the compression chamber and compress the bales together with their straps intact to form a higher density bale of waste material from the at least two strapped low density bales;
   a rectangular ejection port formed at the downstream end of the housing adjacent to and in communication with the compression chamber, the ejection port having a width less than the width of the feed port width; and
   an ejection ram selectively movable through the compression chamber and toward the ejection port to eject the higher density bale from the compression chamber for retrieval.

2. The waste material rebaler of claim 1 wherein a housing is closed except for the feed port and the ejection port formed in the housing.

3. The waste material rebaler of claim 1 wherein a same vertical side wall defines the feed port and the ejection port.

4. The waste material rebaler of claim 1 wherein the ejection port has a width approximately one half the width of the feed port.

5. The waste material rebaler of claim 1 wherein the compression chamber and the compression ram are configured to compress the at least two strapped low density bales of waste material into the higher density bale of waste material in a single compression stroke.

6. The waste material rebaler of claim 1 wherein the waste material is waste paper.

7. A waste material rebaler comprising:
   a rectangular housing formed of first and second vertical side walls and a vertical end wall joined by horizontal top and bottom walls and defining an interior space having an upstream end, a downstream end proximate the vertical end wall, and a width defined by a distance between the first and second vertical side walls;
   a breach defined at the upstream end of the interior space and being sized to receive at least two strapped low density bales of waste material in side-by-side relationship with the long axes of the strapped bales extending across the width of the interior space;
   a compression chamber formed at the downstream end of the interior space in communication with the breach;
   a rectangular feed port formed in the first vertical side wall of the housing adjacent to and in communication with the breach, the feed port having a width;
   the feed port closeable by hydraulically operated doors;
   a loading platform beneath and outboard of the feed port to provide for side loading of waste material bales;
   a compression ram selectively movable through the breach and toward the compression chamber to horizontally move the at least two strapped low density bales of waste material into the compression chamber and compress the bales together with their straps intact to form a higher density bale of waste material from the at least two strapped low density bales;
   a rectangular ejection port formed at the downstream end of the housing adjacent to and in communication with the compression chamber, the ejection port having a width less than the width of the feed port width; and
   an ejection ram selectively movable through the compression chamber and toward the ejection port to eject the higher density bale from the compression chamber for retrieval, the ejection ram connected to a shaft of a hydraulic cylinder that extends through one of the vertical side walls.

8. The waste material rebaler of claim 7 wherein a same vertical side wall defines the feed port and the ejection port.

9. The waste material rebaler of claim 7 wherein the ejection port has a width approximately one half the width of the feed port.

10. The waste material rebaler of claim 7 wherein the compression chamber and the compression ram are configured to compress the at least two strapped low density bales of waste material into the higher density bale of waste material in a single compression stroke.

11. The waste material rebaler of claim 7 wherein the waste material is waste paper.

12. A waste material rebaling system comprising:
    a rectangular housing formed of first and second vertical side walls and a vertical end wall joined by horizontal top and bottom walls and defining an interior space having an upstream end, a downstream end proximate the vertical end wall, and a width defined by a distance between the first and second vertical side walls;

a breach defined at the upstream end of the interior space and being sized to receive at least two strapped low density bales of waste material in side-by-side relationship with the long axes of the strapped bales extending across the width of the interior space;

a compression chamber formed at the downstream end of the interior space in communication with the breach;

a rectangular feed port formed in the first vertical side wall of the housing adjacent to and in communication with the breach, the feed port having a width;

a loading platform beneath and outboard of the feed port to provide for side loading of waste material bales;

a fork lift truck for urging the strapped low density bales of waste material through the feed port and into the breach;

a compression ram selectively movable through the breach and toward the compression chamber to horizontally move the strapped low density bales of waste material into the compression chamber and compress the bales together with their straps intact to form a higher density bale of waste material from the at least two strapped low density bales;

a rectangular ejection port formed at the downstream end in the housing adjacent to and in communication with the compression chamber, the ejection port having a width less than the width of the feed port width; and an ejection ram selectively movable through the compression chamber and toward the ejection port to eject the higher density bale from the compression chamber for retrieval.

13. The waste material rebaling system of claim 12 wherein the housing is closed except for the feed port and the ejection port formed in the housing.

14. The waste material rebaling system of claim 12 wherein a same vertical side wall defines the feed port and the ejection port.

15. The waste material rebaling system of claim 12 wherein the ejection port has a width approximately one half the width of the feed port.

16. The waste material rebaling system of claim 12 wherein the compression chamber and the compression ram are configured to compress the at least two strapped low density bales of waste material into the higher density bale of waste material in a single compression stroke.

17. The waste material rebaling system of claim 12 wherein the waste material is waste paper.

* * * * *

UNITED STATES PATENT AND TRADEMARK OFFICE
CERTIFICATE OF CORRECTION

PATENT NO. : 10,213,978 B2
APPLICATION NO. : 15/099964
DATED : February 26, 2019
INVENTOR(S) : John L. Newsome It is certified that error appears in the above-identified patent and that said Letters Patent is hereby corrected as shown below:

On the Title Page

Item (71) Applicant: delete "Sonoco Development Inc., Hartsville, SC (US)" and insert
--Sonoco Development, Inc., Hartsville, SC (US)"--

Signed and Sealed this
Seventh Day of May, 2019

Andrei Iancu
*Director of the United States Patent and Trademark Office*